(12) United States Patent
Kim et al.

(10) Patent No.: US 10,885,428 B2
(45) Date of Patent: Jan. 5, 2021

(54) NEURAL DEVICE OF PERFORMING CONDITIONED RESPONSE AND METHOD OF DRIVING THE SAME

(71) Applicant: Industry-University Cooperation Foundation Hanyang University, Seoul (KR)

(72) Inventors: Tae Whan Kim, Seoul (KR); Chaoxing Wu, Seoul (KR); Dae Uk Lee, Goyang-si (KR); Hwan Young Choi, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 16/301,506

(22) PCT Filed: Aug. 24, 2017

(86) PCT No.: PCT/KR2017/009245
§ 371 (c)(1),
(2) Date: Nov. 14, 2018

(87) PCT Pub. No.: WO2018/038546
PCT Pub. Date: Mar. 1, 2018

(65) Prior Publication Data
US 2019/0311250 A1    Oct. 10, 2019

(30) Foreign Application Priority Data
Aug. 24, 2016    (KR) ......................... 10-2016-0107921

(51) Int. Cl.
*G06N 3/063*    (2006.01)
*G06N 3/08*    (2006.01)

(52) U.S. Cl.
CPC ............... *G06N 3/063* (2013.01); *G06N 3/08* (2013.01)

(58) Field of Classification Search
None
See application file for complete search history.

(56) References Cited

U.S. PATENT DOCUMENTS 9,842,921 B2 * 12/2017 Eriksson ............. H01L 29/7782
10,424,712 B2 * 9/2019 Schoelkopf, III ...... H01L 27/18
(Continued)

FOREIGN PATENT DOCUMENTS

KR    10-2011-0120406    1/2001

OTHER PUBLICATIONS

Hasegawa et al. (Atomic Switch: Atom/Ion Movement Controlled Devices for Beyond Von-Neumann Computers, Sep. 2011, pp. 252-267) (Year: 2011).*

(Continued)

*Primary Examiner* — George Giroux
(74) *Attorney, Agent, or Firm* — Sughrue Mion, PLLC (57) ABSTRACT

A neural device to which a conditioned response function is imparted and a driving method thereof are disclosed. Quantum dots and a polymer insulating layer are formed between upper and lower electrodes. Conductive filaments are formed at interfaces between the quantum dots and the polymer insulating layer. When a positive pulse, which is an unconditioned stimulus signal, is applied, the conductive filaments are formed, and a low resistance state is implemented. As the number of applications of a negative pulse, which is a conditioned stimulus signal, increases, the neural device is switched from a high resistance state to the low resistance state. Through this, the neural device having learning ability for the conditioned stimulus signal may be implemented and driven.

8 Claims, 5 Drawing Sheets

(56) References Cited

U.S. PATENT DOCUMENTS

| | | | | |
|---|---|---|---|---|
| 2006/0170331 A1* | 8/2006 | Bertram | ............... | B82Y 10/00 |
| | | | | 313/498 |
| 2010/0052654 A1* | 3/2010 | Wei | ............... | H01L 31/0296 |
| | | | | 324/97 |
| 2014/0339497 A1* | 11/2014 | Qu | ............... | B82Y 10/00 |
| | | | | 257/13 |
| 2016/0035920 A1* | 2/2016 | Tashiro | ............... | H04N 5/3575 |
| | | | | 250/208.1 |
| 2016/0267032 A1* | 9/2016 | Rigetti | ............... | G06F 13/36 |
| 2017/0154975 A1* | 6/2017 | Liu | ............... | H01L 21/0212 |
| 2017/0331064 A1* | 11/2017 | Trummer-Sailer | ............... | |
| | | | | H01L 51/5206 |
| 2018/0083214 A1* | 3/2018 | Xu | ............... | H01L 51/0037 |

OTHER PUBLICATIONS

Franceschi et al. (Hybrid superconductor—quantum dot devices, Oct. 2010, pp. 703-711) (Year: 2010).*

Duygu Kuzum, et al., "Synaptic electronics: materials, devices and applications", 2013 IOP Publishing Ltd, Nanotechnology 24 (2013) 382001 (22pp).

William A. Hubbard, et al., "Nanofilament Formation and Regeneration During $Cu/Al_2O_3$ Resistive Memory Switching", ACS Publications, 2015 American Chemical Society, Nano Letter 2015, 15, pp. 3983-3987.

* cited by examiner

NEURAL DEVICE OF PERFORMING CONDITIONED RESPONSE AND METHOD OF DRIVING THE SAME

CROSS REFERENCE TO RELATED APPLICATIONS

This application is a National Stage of International Application No. PCT/KR2017/009245 filed Aug. 24, 2017, claiming priority based on Korean Patent Application No. 10-2016-0107921 filed Aug. 24, 2016.

TECHNICAL FIELD

The present invention relates to a neural device and a driving method thereof, and more particularly, to a neural device capable of responding to repeated conditioned signals and a driving method thereof.

BACKGROUND ART

Recently, neural network devices which are being studied for use in artificial intelligence or the like are devices which imitate a neural transmission system of a human body. The neural transmission system includes neurons and synapses, and when a stimulus exceeding a certain range is input, the neurons perform an operation which produces an output corresponding to the stimulus, and the synapses perform an operation of transmitting signals to other neurons with respect to the repeated output of the neurons Thus, when a stimulus exceeding a certain range is applied or when a stimulus exceeding a certain number is input, a neural device imitating neurons generates an output corresponding to the stimulus. Further, a neural device imitating synapses has a characteristic in which its impedance is changed due to a continuously applied stimulus.

Korean Patent Application Publication No. 2016-0056816 discloses neuromorphic devices with an excitatory or inhibitory function. Which discloses a synapse imitating device having a structure in which two nMOSs are connected in series, and in which a program voltage or the like is applied to two lower electrodes to change a threshold voltage of each channel. In particular, since the excitatory or inhibitory function may be defined by a bias applied to an upper electrode, the excitatory or inhibitory function is implemented according to the bias condition applied to the upper electrode because it has a series connection structure. However, it is expected that the consequent output current may not be largely distinguished.

Further, Korean Patent Registration No. 1537433 discloses a memristor device. The memristor device includes a resistance random access memory and a Schottky diode, which are arranged to be mutually parallel to selectively operate as a memory or diode.

However, the above-mentioned patents may not be implemented to conform to the operating characteristics of neural devices, are not uniform in processing or response of applied signals due to a complicated structure thereof, and may cause variations in characteristic values. Further, manufacturing costs may be increased due to features including a plurality of functions.

Accordingly, the appearance of a technique for implementing a neural device with a simpler structure and operating the neural device is still required.

DISCLOSURE

Technical Problem

The present invention is directed to providing a neural device having a learning function with respect to a conditioned stimulus.

The present invention is also directed to providing a method of driving the neural device having learning function with respect to a conditioned stimulus.

Technical Solution

One aspect of the present invention provides a neural device including a lower electrode; quantum dots formed on the lower electrode; a polymer insulating layer filling a separation space between the quantum dots; and an upper electrode formed on the quantum dots or the polymer insulating layer.

Another aspect of the present invention provides a method of driving a neural device having quantum dots and a polymer insulating layer between an upper electrode and a lower electrode, including: applying a positive voltage difference between the upper electrode and the lower electrode to form conductive filaments at an interface between the quantum dots and the polymer insulating layer, thereby allowing the neural device to enter a low resistance state; applying a negative voltage difference between the upper electrode and the lower electrode to remove the conductive filaments adjacent to the upper electrode; and alternately applying the positive voltage difference and the negative voltage difference between the upper electrode and the lower electrode to accumulate the removed conductive filaments adjacent to the upper electrode.

Advantageous Effects

According to the present invention described above, a positive pulse corresponding to an unconditioned stimulus and a negative pulse corresponding to a conditioned stimulus are repeatedly applied. In an early stage, when the positive pulse, which is an unconditioned stimulus signal, is applied, the low resistance state is maintained, and when the negative pulse, which is a conditioned stimulus signal, is applied, the high resistance state is maintained. When the conditioned stimulus signal is repeatedly applied, the neural device learns the signal and switches to the low resistance state which is the same state as when the unconditioned stimulus signal is applied.

Such a method enables the present invention to be utilized as a neuron device, and the neuron device may be realized with a simpler structure.

MODES OF THE INVENTION

While the present invention is susceptible to various modifications and alternative forms, specific embodiments thereof are shown by way of example in the drawings and will herein be described in detail in the text. It should be understood, however, that there is no intent to limit the present invention to the particular forms disclosed, but on the contrary, the present invention is to cover all modifications, equivalents, and alternatives falling within the spirit and scope of the present invention. Similar reference numerals are used for similar elements in describing each drawing.

Unless otherwise defined, all terms used herein, including technical and scientific terms, have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Hereinafter, exemplary embodiments of the present invention will be described more fully with reference to the accompanying drawings.

Embodiment

Figure 1:
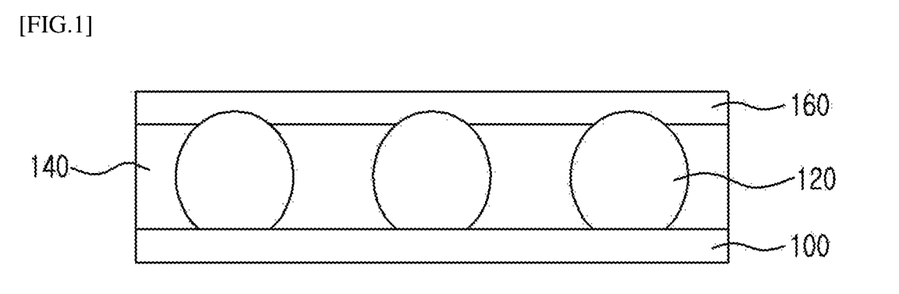
FIG. 1 is a cross-sectional view illustrating a neural device according to an exemplary embodiment of the present invention.

FIG. 1 is a cross-sectional view illustrating a neural device according to an exemplary embodiment of the present invention.

Referring to FIG. 1, a neural device according to the present exemplary embodiment includes a lower electrode 100, quantum dots 120, a polymer insulating layer 140, and an upper electrode 160.

The lower electrode 100 may be formed of a conductive metal or a conductive oxide, for example, indium tin oxide (ITO) or the like. The lower electrode may include a material such as Au, Pt, Cr, Ni, Al, Cu, Ag, Au, Ni, Zn, Cd, Pd Ti, AlZnO, or ITO. A current flowing through the lower electrode 100 forms an output signal.

The quantum dots 120 are formed on the lower electrode 100, and preferably, a quantum dot structure of $Al_2O_3$ is formed The quantum dots 120 may be formed by forming an Al layer of a thin film on a lower electrode 100 and heat-treating the formed Al layer in an oxygen atmosphere to obtain a regularly arranged $Al_2O_3$ structure.

Further, the polymer insulating layer 140 is formed in a separation space between the quantum dots 120. The polymer insulating layer 140 is formed on side parts or upper parts of the quantum dots 120 and may be formed on exposed surface of the lower electrode 100 on which the quantum dots 120 are not formed and thus surfaces thereof are exposed. Further, filaments of metal atoms are formed or disappeared at interfaces between the quantum dots 120 and the polymer insulating layer 140. That is, the interfaces between the quantum dots 120 and the polymer insulating layer 140 act as channels in which the filaments formed of the metal atoms are formed. The polymer insulating layer 140 may include polyimide.

The upper electrode 160 is formed on the quantum dots 120 or the polymer insulating layer 140. The upper electrode 160 may be formed of metal materials and is selected from materials capable of supplying the metal atoms to the interfaces of the polymer insulating layer 140. For example, the upper electrode 160 may include Cu, Ag, Au, Ni, Zn, Cd, Pd, or an alloy thereof.

Particularly, a portion of the quantum dots 120 may be formed in contact with the upper electrode 160. Thus, the interfaces between the quantum dots 120 and the polymer insulating layer 140 are formed between the upper electrode 160 and the lower electrode 100, and a resistance thereof may be adjusted through the formation and disappearance of the conductive filaments formed at the interfaces.

When a positive voltage is applied between the upper electrode and the lower electrode, metal cations are supplied from the upper electrode to the interfaces between the quantum dots and the polymer insulating layer. The supplied metal cations are reduced by electrons supplied from the lower electrode to form the conductive filaments of metal particles. Further, when a negative voltage is applied between the upper electrode and the lower electrode, the conductive filaments are oxidized to the metal cations, and the formed metal cations move to the upper electrode so that conductive channels are disappeared.

FIGS. 2 to 6 are cross-sectional views illustrating an operation of the neural device of FIG. 1 according to the exemplary embodiment of the present invention.

In FIGS. 2 to 6, the lower electrode 100 is formed of ITO, the quantum dots 120 are formed of $Al_2O_3$, the polymer insulating layer 140 is formed of polyimide, and the upper electrode 160 is formed of Ag.

Figure 2:
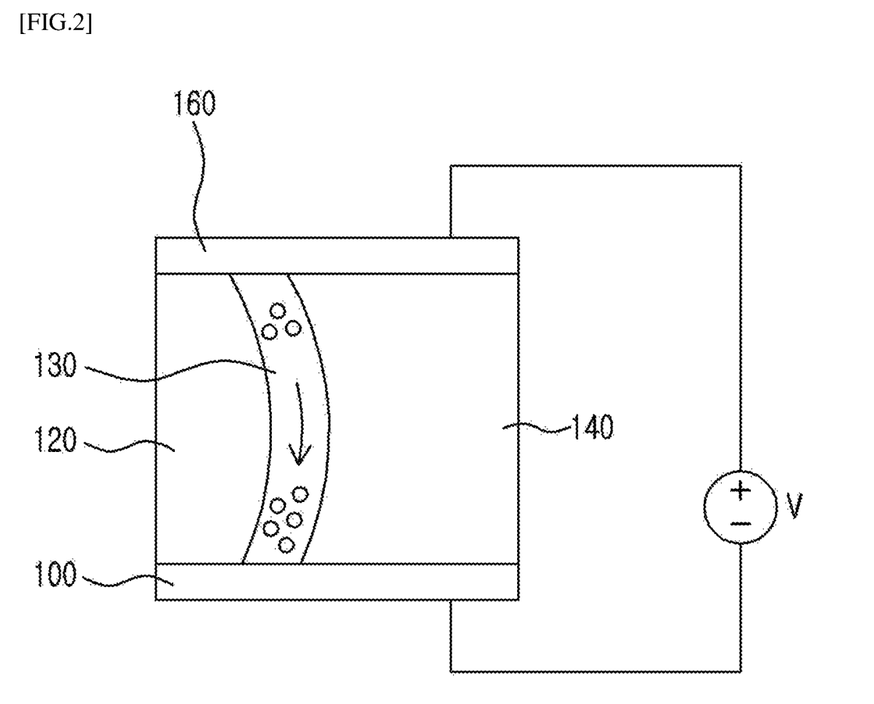
FIGS. 2 to 6 are cross-sectional views illustrating an operation of the neural device of FIG. 1 according to the exemplary embodiment of the present invention.

Referring to FIG. 2, the positive voltage is applied to the upper electrode 160, and the negative voltage or a ground voltage is applied to the lower electrode 100. That is, a positive voltage difference V is applied between the upper electrode 160 and the lower electrode 100. Ag of the upper electrode 160 is ionized to $Ag^+$ by the positive voltage applied to the upper electrode 160. That is, an oxidation reaction of Ag occurs in the upper electrode 160 due to the applied positive voltage. Ag cations generated in the upper electrode 160 move to the lower electrode due to the negative voltage or the ground voltage applied to the lower electrode 100.

That is, the Ag cations move to the lower electrode 100 due to a positive potential difference applied between the upper electrode 160 and the lower electrode 100. The Ag cations move through an interface 130 between the quantum dot 120 and the polymer insulating layer 140. However, since the quantum dots 120 have an oxide composition, movement of the metal ions into the quantum dot is not easy. Further, it is practically impossible for the metal ions to move into the polymer insulating layer 140 due to an interlinked and bonded polymer chain structure. However, since the interface 130 between the quantum dot 120 and the polymer insulating layer 140 is in a state in which only weak coupling or physical bonding is performed, the interface 130 may act as a movement channel for the metal ions.

The Ag cations move through the interface 130 between the quantum dot 120 and the polymer insulating layer 140 due to the negative voltage or the like applied from the lower electrode 100 and move to the lower electrode 100. In the lower electrode 100, the Ag cations are reduced to be an Ag metal. That is, Ag metal atoms from the lower electrode 100 are accumulated at the interface 130 between the quantum dot 120 and the polymer insulating layer 140.

Figure 3:
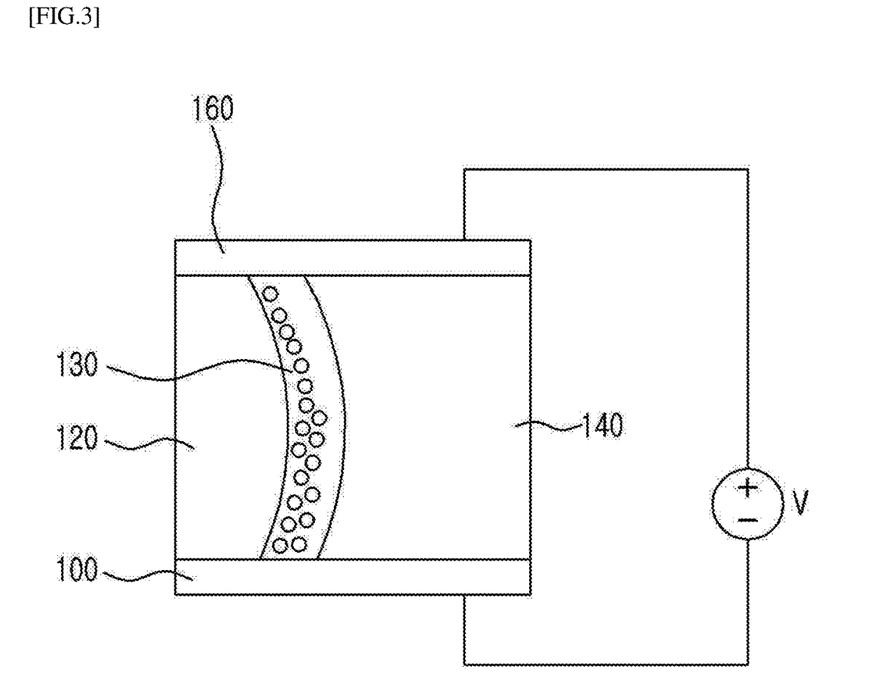

Referring to FIG. 3, the Ag metal atoms are accumulated at the interface 130 between the quantum dot 120 and the polymer insulating layer 140 to form filaments of the Ag metal, which are the conductive channels from the lower electrode 100 to the upper electrode 160. Thus, a phenomenon in which the resistance between the upper electrode 160 and the lower electrode 100 is reduced occurs.

Figure 4:
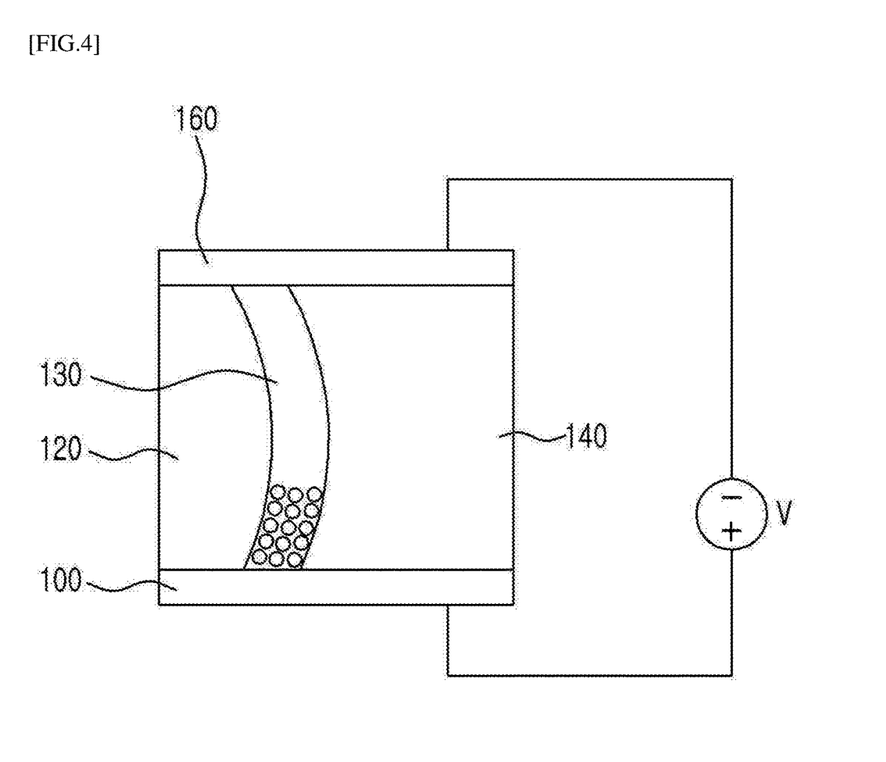

Referring to FIG. 4, the negative voltage or the ground voltage is applied to the upper electrode 160, and the positive voltage is applied to the lower electrode 100. That is, a negative voltage difference is generated between the upper electrode 160 and the lower electrode 100, and the Ag metal atoms forming the conductive filaments disappear from a region close to the upper electrode 160. That is, the Ag metal atoms are oxidized to cations through the interface 130 between the quantum dot 120 and the polymer insulating layer 140 and move to the upper electrode 160.

Accordingly, a portion of the conductive filaments connecting between the upper electrode 160 and the lower electrode 100 disappears so that a high resistance state is maintained between the two electrodes.

However, the Ag metal atoms at the interface adjacent to the lower electrode 100 remain and form a portion of the conductive filaments due to an insufficient pulse width of the negative voltage difference applied between the two electrodes.

Figure 5:
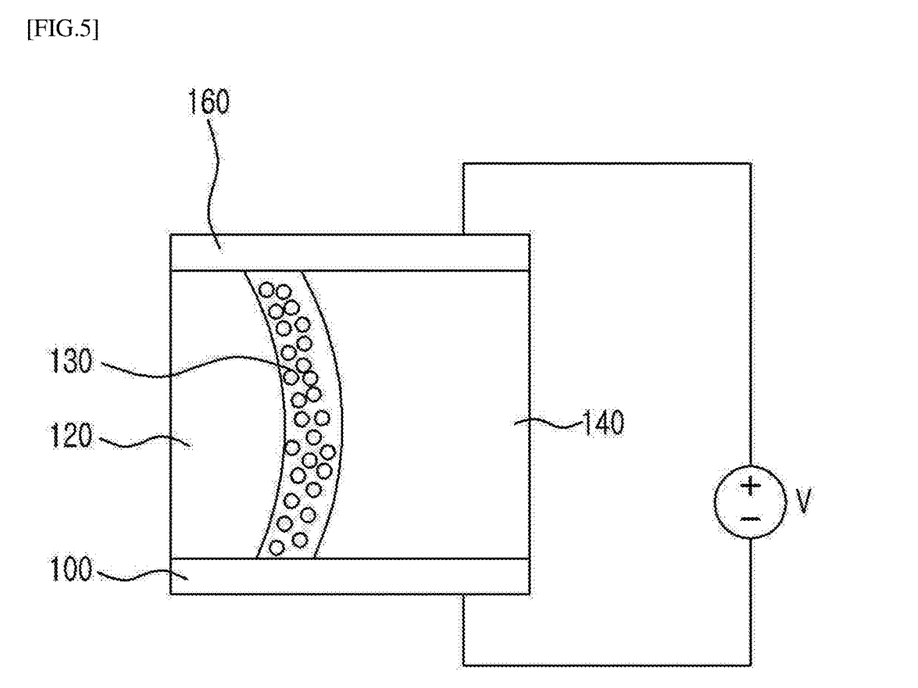

Referring to FIG. 5, the positive voltage difference is applied between both electrodes again. That is, the upper electrode 160 has a high voltage, and the lower electrode 100 has a low voltage. The conductive filaments as illustrated in FIG. 3 are formed at the interface 130 between the quantum dot 120 and the polymer insulating layer 140 due to the applied voltage difference.

However, since the conductive filaments in FIG. 5 are formed on the basis of the remaining conductive filaments in FIG. 4, the number of Ag metal atoms forming the conductive filaments increases and thus the conductive filaments having a higher density are formed.

Figure 6:
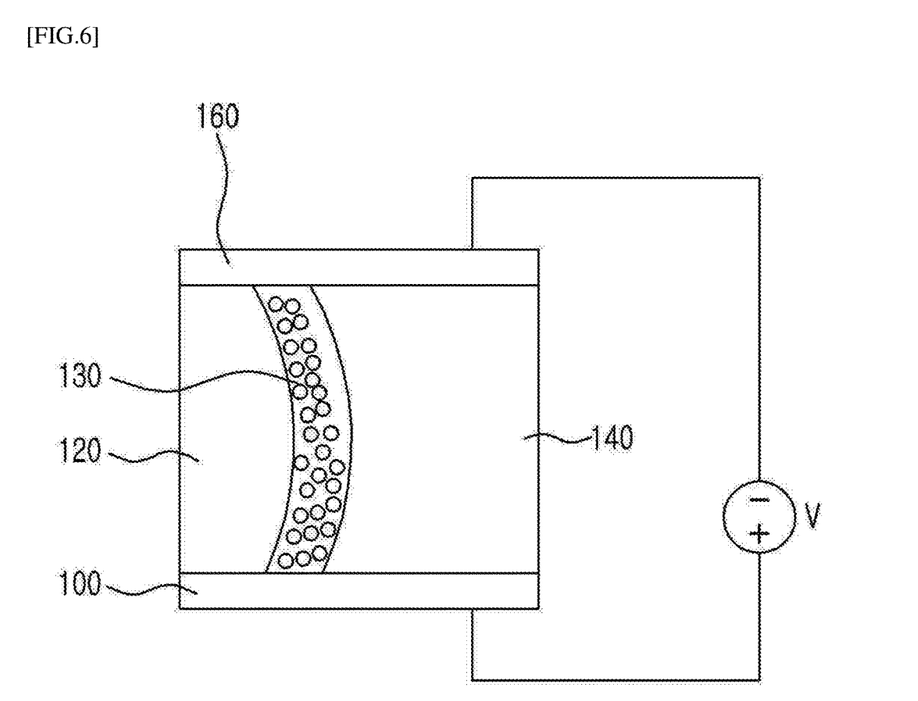

Subsequently, referring to FIG. 6, the positive voltage is applied to the lower electrode 100, and the negative voltage or the ground voltage is applied to the upper electrode 160. That is, the negative voltage difference is applied between the upper electrode 160 and the lower electrode 100. When the negative voltage difference is applied, the Ag metal atoms of the conductive filaments are oxidized, and Ag cations move to the upper electrode 160. However, since the Ag metal atoms forming the conductive filaments maintain a high density at the interface between the quantum dot and the polymer insulating layer, the conductive filaments are maintained for a certain period in which the negative voltage difference is applied. Thus, the neural device maintains a low resistance state even when a negative voltage bias is applied.

In the above-described mechanisms of FIGS. 2 to 6, when the positive voltage difference is applied between the upper electrode 160 and the lower electrode 100, the conductive filaments are formed, and when the negative voltage difference is applied, the conductive filaments disappear. However, metal atoms of the conductive filaments are accumulated at the interface between the quantum dot 120 and the polymer insulating layer 140 while the positive voltage difference and the negative voltage difference are alternately and repeatedly formed. Accordingly, when a certain number of times pass, the low resistance state is maintained between the upper electrode 160 and the lower electrode 100 even when the negative voltage difference is applied.

Figure 7:
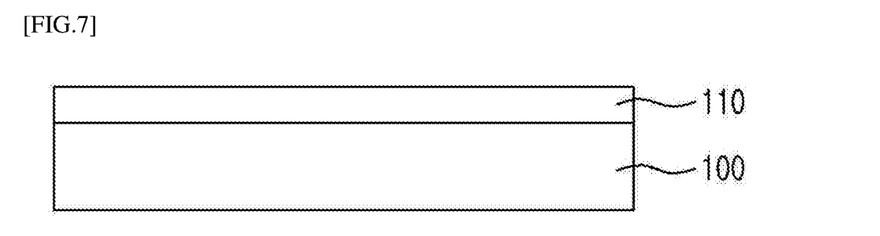
FIGS. 7 to 9 are cross-sectional views for describing a method of manufacturing the neural device of FIG. 1 according to the exemplary embodiment of the present invention.
Figure 8:
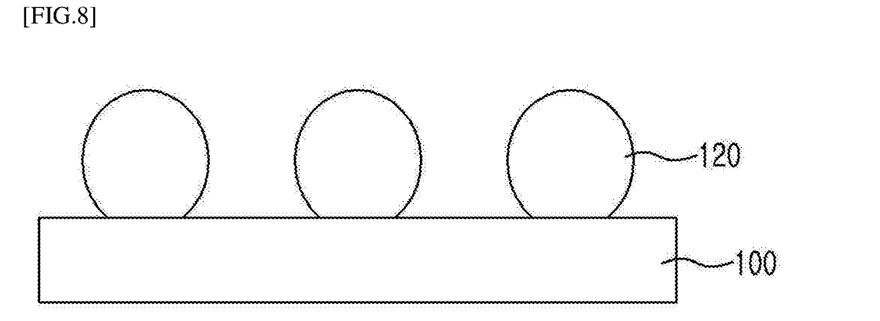
Figure 9:
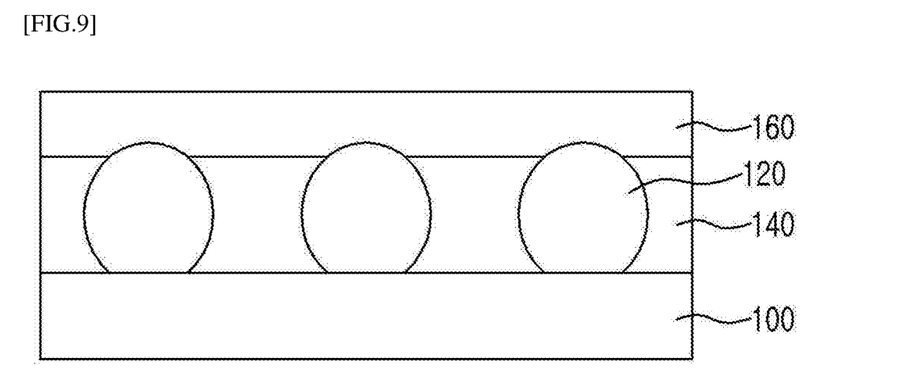

FIGS. 7 to 9 are cross-sectional views for describing a method of manufacturing the neural device of FIG. 1 according to the exemplary embodiment of the present invention.

Referring to FIG. 7, a metal thin film 110 is formed on the lower electrode 100. The lower electrode 100 may include a material such as Au, Pt, Cr, Ni, Al, Cu, Ag, Au, Ni, Zn, Cd, Pd Ti, AlZnO, or ITO.

Further, the metal thin film 110 may be formed of Al. For example, an Al film of 5 nm may be formed on the lower electrode 100 by thermal evaporation.

Referring to FIG. 8, the metal thin film 110 is formed as the quantum dots 120 on the lower electrode 100. For example, when the Al metal thin film formed on the lower electrode 100 is subjected to a heat treatment process at 300° C. to 400° C. for 0.5 hours to 2 hours in an oxygen atmosphere, the metal thin film 110 is formed as the quantum dots 120 of $Al_2O_3$. A size of the quantum dot 120 may be set to 5 nm to 10 nm. That is, a diameter of the quantum dot 120 may be set to 5 nm to 10 nm. When the diameter of the quantum dots 120 is less than 5 nm, it is substantially difficult to form the quantum dots 120 through the heat treatment process, and when the diameter of the quantum dots 120 exceeds 10 nm, a heat treatment temperature for forming the quantum dots 120 is increased and a heat treatment time is increased, thereby decreasing a productivity. When the heat treatment temperature is less than 300° C., it is difficult to obtain sufficient melting of the Al metal thin film, and when the heat treatment temperature exceeds 400° C., the Al metal thin film is excessively melted and thus the quantum dots 120 of the desired size may not be formed.

When the Al metal thin film is subjected to a heat treatment process in the oxygen atmosphere, the Al metal thin film is partially melted or combined with oxygen to form $Al_2O_3$. Further, the formed $Al_2O_3$ fine particles act as nuclei for growth so that a phenomenon, in which $Al_2O_3$ formed thereafter is aggregated to the already formed $Al_2O_3$, occurs. Through this, the regularly arranged quantum dots of $Al_2O_3$ may be obtained. Further, the Al metal thin film is formed as the quantum dots 120 of $Al_2O_3$, and regions of the lower electrode 100 on which the quantum dots are not formed are exposed due to the aggregation phenomenon.

Referring to FIG. 9, the separation space between the quantum dots 120 is filled with the polymer insulating layer 140. The polymer insulating layer 140 may be formed through a coating process using a polyimide precursor. A solvent used as the polyimide precursor to be used is N-methyl-2-pyrrolidone, to which polyamic acid of p-phenylene biphenyltetracarboximide (BPDA-PDA) is dissolved. For example, the structure of FIG. 8 is spin-coated with the polyimide precursor and followed by heat treatment to form the polymer insulating layer 140.

Then, the upper electrode 160 is formed on the polymer insulating layer 140. The upper electrode 160 may include Cu, Ag, Au, Ni, Zn, Cd, Pd, or an alloy thereof. In particular, the upper electrode 160 supplies the metal ions to form the conductive filaments.

The upper electrode 160 may be formed through a conventional thermal evaporation method.

Further, the upper electrode 160 may be formed in contact with the polymer insulating layer 140 and a portion of top surfaces of the quantum dots 120.

Manufacturing Example

Figure 10:
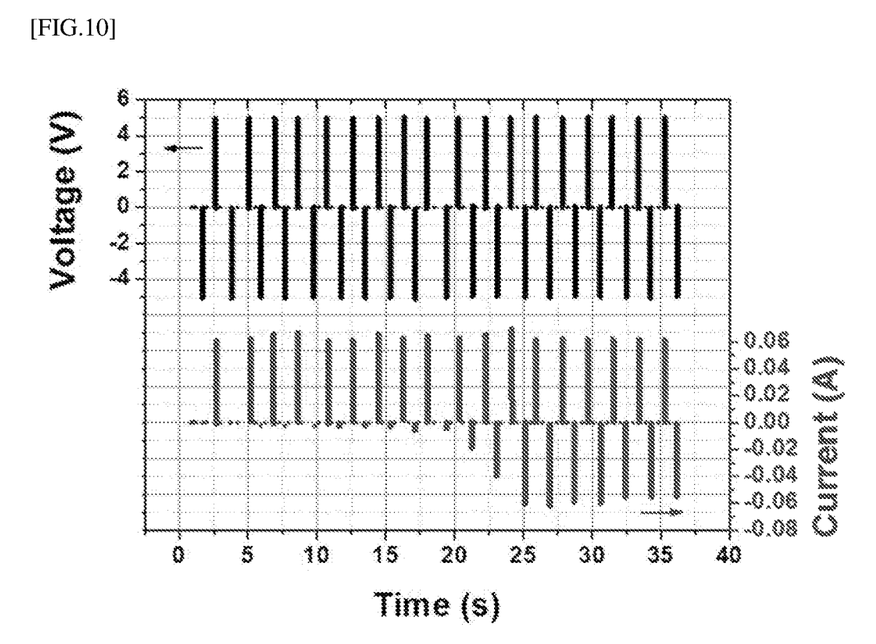
FIG. 10 is a graph illustrating response characteristics for describing an operation of a neural device manufactured according to a manufacturing example of the present invention.

FIG. 10 is a graph illustrating response characteristics for describing an operation of a neural device manufactured according to a manufacturing example of the present invention.

Referring to FIG. 10, ITO is used as a lower electrode, and Ag is used as an upper electrode. Further, quantum dots are formed of $Al_2O_3$, and polyimide is used as a polymer insulating layer. A thermally evaporated Al metal thin film is heat-treated at 350° C. for 1 hour in an oxygen atmosphere to form the quantum dots. The polyimide precursor used is N-methyl-2-pyrrolidone to which polyamic acid of p-phenylene biphenyltetracarboximide (BPDA-PDA) is dissolved and is spin-coated at 7800 rpm.

A pulse signal is alternately applied between the upper electrode and the lower electrode of the neural device manufactured through the above-described process. For example, a pulse of +5 V and a pulse of −5 V are alternately applied between the upper electrode and the lower electrode, and a current flowing through the lower electrode is measured. A current flowing out from the lower electrode is set to (+), and a current flowing into the lower electrode is defined as (−), each of which is defined to have a pulse width of 10 nsec.

Referring to FIG. 10, when the pulse of +5 V is applied, the current measured at the lower electrode increases due to the formation of conductive filaments, and through this, it can be seen that the neural device is in a low resistance state. Further, at an early stage of the application of the pulse of −5 V, the current measured at the lower electrode is very small due to the disappearance of the conductive filaments.

When the pulse of +5V and the pulse of −5V are repeatedly applied, metal atoms of the conductive filaments are accumulated at the interface between the quantum dots and the polymer insulating layer. Accordingly, a phenomenon in which a negative current value increases even in a state in which the pulse of −5 V is applied occurs. Thus, finally, it can be seen that the conductive filaments do not disappear and maintain the low resistance state even in a state in which the negative pulse is applied.

That is, when a voltage of +5 V and a voltage of −5 V are repeatedly applied, an output signal is changed such that a negative output current level is gradually saturated to a constant value according to the number of applied pulses, and a positive output current level is maintained in a stable high current state.

The above-described operation may be construed as a passage of neurons with respect to an input signal including an unconditioned stimulus and a conditioned stimulus. That is, one pulse having a magnitude of 5V may be defined as the unconditioned stimulus, and one pulse having a magnitude of −5V may be defined as the conditioned stimulus. An output current for each pulse is represented as a conditioned response and an unconditioned response.

For example, Pavlov's experiments with dogs may be used to understand neural learning behavior of the neural device. In the early stages, only ringing of a bell may not make the dog salivate. However, when the dog is given a training course that repeats the act of feeding the dog while ringing the bell, Pavlov's dog develops an ability to associate with the bell and the food, and as a result, the dog secretes saliva only with the ringing of the bell.

In the present invention, the pulse of 5V is the unconditioned stimulus (a stimulus such as food), which is applied to the neural device, and the pulse of −5V may be set as the conditioned stimulus (a stimulus such as a bell). When the conditioned stimulus is continuously applied to increase the number of instances of training, which is a training process, a current of the same level as the output current which appears in the unconditioned stimulus may be obtained. Accordingly, it can be seen that the neural device learns the input stimulus signal and forms an effective relationship between the conditioned stimulus and the unconditioned stimulus.

According to the present invention described above, a positive pulse corresponding to the unconditioned stimulus and a negative pulse corresponding to the conditioned stimulus are repeatedly applied. In an early stage, when the positive pulse, which is an unconditioned stimulus signal, is applied, the low resistance state is maintained, and when the negative pulse, which is a conditioned stimulus signal, is applied, the high resistance state is maintained. When the conditioned stimulus signal is repeatedly applied, the neural device learns the signal and switches to the low resistance state which is the same state as when the unconditioned stimulus signal is applied.

Such a method enables the present invention to be utilized as a neuron device, and the neuron device may be realized with a simpler structure.

The invention claimed is:

1. A neural device comprising:
a lower electrode;
a plurality of quantum dots formed on the lower electrode and contacting with the lower electrode;
a polymer insulating layer filling a separation space between individual quantum dots of the plurality of quantum dots; and
an upper electrode formed on the plurality of quantum dots and the polymer insulating layer, and contacting with the plurality of quantum dots and the polymer insulating layer,
wherein the upper electrode supplies metal cations to an interface between an individual quantum dot of the plurality of quantum dots and the polymer insulating layer, and the metal cations form conductive filaments at the interface between the individual quantum dot and the polymer insulating layer by reduction, and
wherein the polymer insulating layer fills a space between the lower electrode and the upper electrode.

2. The device of claim 1, wherein the lower electrode includes Au, Pt, Cr, Ni, Al, Cu, Ag, Au, Ni, Zn, Cd, Pd Ti, AlZnO, or ITO.

3. The device of claim 1, wherein the individual quantum dot includes $Al_2O_3$, and a diameter of the individual quantum dot is 5 nm to 10 nm.

4. The device of claim 1, wherein the polymer insulating layer includes a polyimide.

5. The device of claim 1, wherein the upper electrode includes Cu, Ag, Au, Ni, Zn, Cd, Pd, or an alloy thereof.

6. A method of driving a neural device having a plurality of quantum dots and a polymer insulating layer between an upper electrode and a lower electrode, in which the plurality of quantum dots are in contact with the lower electrode and the upper electrode, and the polymer insulating layer fills a space between individual quantum dots of the plurality of quantum dots, and fills a separation space between the lower electrode and the upper electrode,
the method comprising:
applying a positive voltage difference between the upper electrode and the lower electrode to form conductive filaments at an interface between an individual quantum dot of the plurality of quantum dots contacting with the upper electrode and the polymer insulating layer, thereby allowing the neural device to enter a low resistance state;
applying a negative voltage difference between the upper electrode and the lower electrode to remove the conductive filaments adjacent to the upper electrode; and
alternately applying the positive voltage difference and the negative voltage difference between the upper electrode and the lower electrode to accumulate the removed conductive filaments adjacent to the upper electrode.

7. The method of claim 6, wherein the positive voltage difference is used as an unconditioned stimulus, and the negative voltage difference is used as a conditioned stimulus.

8. The method of claim 7, wherein as the number of repeated applications of the unconditioned stimulus and the conditioned stimulus increases, the neural device enters the low resistance state which is the same as the unconditioned stimulus.

* * * * *